(12) United States Patent
Eskolin et al.

(10) Patent No.: US 9,257,098 B2
(45) Date of Patent: Feb. 9, 2016

(54) APPARATUS AND METHODS FOR DISPLAYING SECOND CONTENT IN RESPONSE TO USER INPUTS

(75) Inventors: Jan Peter Erik Eskolin, Pirkkala (FI); Juha Henrik Arrasvuori, Tampere (FI)

(73) Assignee: Nokia Technologies Oy, Espoo (FI)

( * ) Notice: Subject to any disclaimer, the term of this patent is extended or adjusted under 35 U.S.C. 154(b) by 147 days.

(21) Appl. No.: 13/336,818

(22) Filed: Dec. 23, 2011

(65) Prior Publication Data
US 2013/0162667 A1  Jun. 27, 2013

(51) Int. Cl.
  *G09G 5/00*  (2006.01)
  *G09G 5/14*  (2006.01)
  *G06F 3/0488*  (2013.01)

(52) U.S. Cl.
  CPC .............. *G09G 5/14* (2013.01); *G06F 3/0488* (2013.01); *G06F 3/04886* (2013.01); *G09G 2354/00* (2013.01)

(58) Field of Classification Search
  USPC .......................................................... 345/629
  See application file for complete search history.

(56) References Cited

U.S. PATENT DOCUMENTS

| | | | | |
|---|---|---|---|---|
| 6,002,397 | A * | 12/1999 | Jaaskelainen, Jr. | ........... 715/805 |
| 7,596,766 | B1 | 9/2009 | Sharma et al. | |
| 7,992,087 | B1 | 8/2011 | Cameron | |
| 2005/0091612 | A1 | 4/2005 | Stabb et al. | |
| 2006/0026521 | A1 * | 2/2006 | Hotelling et al. | ............. 715/702 |
| 2006/0059432 | A1 | 3/2006 | Bells | |
| 2008/0055269 | A1 | 3/2008 | Lemay et al. | |
| 2009/0174684 | A1 | 7/2009 | Ryu et al. | |
| 2009/0228791 | A1 | 9/2009 | Kim et al. | |
| 2010/0050076 | A1 | 2/2010 | Roth | |
| 2010/0302172 | A1 | 12/2010 | Wilairat | |
| 2011/0061021 | A1 * | 3/2011 | Kang et al. | ..................... 715/800 |
| 2011/0265000 | A1 | 10/2011 | Colley | |
| 2013/0155308 | A1 * | 6/2013 | Wu et al. | .................. 348/333.05 |

FOREIGN PATENT DOCUMENTS

| | | |
|---|---|---|
| EP | 0537100 A2 | 4/1993 |
| EP | 2 077 490 A2 | 7/2009 |
| EP | 2302497 A2 | 3/2011 |

OTHER PUBLICATIONS

Bier, Eric A., et al. "Toolglass and magic lenses: the see-through interface." Proceedings of the 20th annual conference on Computer graphics and interactive techniques. ACM, 1993.*

(Continued)

*Primary Examiner* — Mark Zimmerman
*Assistant Examiner* — Vu Nguyen
(74) *Attorney, Agent, or Firm* — Alston & Bird LLP (57) ABSTRACT

An apparatus is configured to detect one or more particular user inputs from respective one or more positions, each position associated with a respective edge region of a display; and upon detection of the one or more particular user inputs, modify at least a portion of a foreground view on the display to create a peep-hole within the foreground view in the portion, the foreground view comprising first content data associated with a foreground application and the peep-hole comprising second content data. In this way, the peep-hole may be considered to replace parts of the foreground view with second content data. Corresponding methods and computer programs are also described.

16 Claims, 7 Drawing Sheets

(56) References Cited

OTHER PUBLICATIONS

Spoonauer, Mark. "Android Ice Cream Sandwich: What's Cool, What's Melted." Laptop Magazine. N.p., Nov. 23, 2011. Web. <http://blog.laptopmag.com/android-ice-cream-sandwich-what%E2%80%99s-cool-what%E2%80%99s-melted>.*

"Welcome to Windows 7." (2009): n. pag. Web. Sep. 9, 2015. <https://www.salisbury.edu/helpdesk/doc/Computer/Operating_System_Bios_Boot/OS_Windows7ProductGuide.pdf>.*

International Search Report and Written Opinion for Application No. PCT/IB2012/057145, dated Jul. 9, 2013.

Extended European Search Report from corresponding European Patent Application No. 12859100.5 dated Oct. 21, 2015.

\* cited by examiner

APPARATUS AND METHODS FOR DISPLAYING SECOND CONTENT IN RESPONSE TO USER INPUTS

TECHNICAL FIELD

The present disclosure relates to the field of user interfaces, associated methods, computer programs and apparatus. Certain disclosed aspects/embodiments relate to portable electronic communications devices, in particular, so-called hand-portable electronic communications devices which may be hand-held in use (although they may be placed in a cradle in use). Such hand-portable electronic devices include so-called Personal Digital Assistants (PDAs) and tablet personal computers.

The portable electronic communications devices/apparatus according to one or more disclosed aspects/embodiments may provide one or more audio/text/video communication functions (e.g. tele-communication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND OF THE INVENTION

It is common for electronic devices to provide a graphical user interface. A graphical user interface may enable a user to interact with an electronic device, for example, to open applications using application icons, to select menu items from a menu, or to enter characters using a virtual keypad. The user may interact with the graphical user interface directly (e.g. by using a stylus, such as a finger, on a touch screen) or indirectly (e.g. using a mouse to control a cursor). Generally user interfaces allow the user to interact with one application at a time.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

BRIEF SUMMARY OF THE INVENTION

In a first aspect, there is provided an apparatus comprising:
at least one processor; and
at least one memory including computer program code,
the at least one memory and the computer program code configured to, with the at least one processor, cause the apparatus to perform at least the following:
detect one or more particular user inputs from respective one or more positions, each position associated with a respective edge region of a display; and
in response to the detection of the one or more particular user inputs, modify at least a portion of a foreground view on the display to create a peep-hole within the foreground view in the portion, the foreground view comprising first content data associated with a foreground application and the peep-hole comprising second content data.

The apparatus may be configured to modify at least a corresponding portion of a foreground view on the display to create a peep-hole within the foreground view in the portion, corresponding to the detected position of the edge user input.

The peep-hole may be considered to replace parts of the foreground view in the portion (e.g., in some instances but not necessarily all, a portion corresponding to the one or more positions associated with the respective edge region input) with second content data. The peep-hole may be considered to allow the user to peek at second content data. The peep-hole may be configured to provide a momentary and partial view of second content data. In some embodiments, the peep-hole may also provide access for editing second content data.

The position of the peep-hole may be independent of the positions of the one or more particular user inputs. For example, the position of the peep-hole may be pre-defined (e.g. user defined in advance) and/or dependent on an event (e.g. the peep-hole position may be calculated to reveal information relating to an event, such as a received message, a software update, download progress).

The peep-hole may persist whilst the one or more user inputs are ongoing (e.g. the peep-hole may be removed upon detection of the end of the one or more user input). The peep-hole may persist after the one or more user inputs are complete (e.g. persist for a pre-determined period of time, or until a further user input is detected). The peep-hole may be created upon detecting the one or more user inputs. The peep hole may be created to be any shape and/or orientation (e.g. defined by the input positions). For example, the peep-hole may be created to be vertical or horizontal.

The peep-hole may allow the user to "peek behind" the foreground application to what lies underneath. For example, the previously open application's screen could be shown, or a task switching application could be shown, or based on the presently open application and user's context the device could calculate what relevant information should be shown or what the user might be interested in quickly glancing.

A subsequent position of the peep-hole may be based on the orientation of the device. For example, the peep-hole may be configured to move upwards, such that if the device is configured to be in an upright position the peep-hole would move from its initial position upwards. In another embodiment, the peep-hole may be configured to move downwards (i.e., in direction of gravity) when the user ceases to press the side or sides of the device.

The subsequent position of the peep-hole may be based on information relating to an event. For example, to help ensure that the user gets a relevant peek into the application, the peep-hole may be configured to move such that in the peep-hole reveals second content relating to information that has been recently updated. This may be done regardless of the initial position of the peep-hole.

The peep-hole may be configured to display second content data relating to an event (e.g. a received message, a received email, a received news feed update, a scheduled update).

The area of the peephole may be pre-defined, user-defined or based on the one or more particular user inputs. For example, it may be a predetermined or user-defined sized rectangle, or it may be calculated based on parameters of the one or more particular user inputs (e.g. pressure, position, type of input, gesture type).

An edge region may be considered to be a region of the display located at the edge of the display. For example, an edge region may be located at the top of the display, at the bottom of a display, or at the side of the display (e.g. at a lateral side, such as at the left or right of the display from the users point of view).

The foreground view may be a locked screen view (e.g. a screen saver in a background mode). For example, when the foreground view is a locked screen view the user can create a peep-hole to peek at, for example, received notifications from social network sites, missed calls, received text messages, emails, and/or instant messages.

The second content data displayed may depend on the position of the peep-hole. For example, if the peep-hole is created on a top-half part of the display, the second content may comprise a list of received new email messages from a first mail account (e.g. Gmail™ account), and when the peep-hole is created in the lower-part of the display, the second content may comprise a list of new emails from a second mail account (e.g. Outlook®). This position dependent second content may be information related to a same application (e.g. an email application) or more than one applications (e.g. second content comprises calendar second content or previous message second content depending on the peep-hole position) when replying to a calendar invitation email.

The apparatus may be configured to leave the remaining portions of the foreground view not associated with the peep-hole otherwise unchanged.

In response to the cessation of the detection of the particular user inputs, the apparatus may be configured to remove the peep-hole to again provide the foreground view.

The peep-hole may provide a view of the second content data which is user perceived to be in one of a layer below the layer of the first content data or in a layer at the same layer as the layer of the first content data (e.g. by using shadow, blurring or size visual effects).

The second content data may be associated with at least one of a further application and content data other than the first content data associated with a foreground view application. For example, a web browser may be available in the foreground view and the second content provided by the peep-hole may relate to an email application. The second content data may be associated with a background application.

The second content data may provide a different view of at least some of the same content data available from the foreground view. For example, a user may be typing an email using an email application in a foreground view and the second content data provided by the peep-hole may relate to the inbox of the same email application.

The apparatus may be configured to reveal a portion (e.g. a corresponding portion) of a background view, the foreground view associated with a first application or window and the background view associated with a second application or window.

The application in the background may provide a visual, auditory and/or tactile indication (e.g. a new email alert, a new message alert) that some information has been updated, to prompt the user to take a peek into it, using a peep-hole.

The position of the peep-hole may be related to the one or more edge positions associated with the one or more detected particular user input.

The one or more particular user inputs may be received via one or more of:
 a stretch sensor;
 a capacitive sensor;
 a button stripe; and
 a resistive stripe.

The one or more positions of the one or more inputs correspond to edge positions of the display or edge positions of a portable electronic device. For example, the one or more inputs may be received from the edge positions of a phone/portable electronic device. It will be appreciated that the one or more inputs may be received from non-edge positions of a phone/portable electronic device. For example, an input may be provided at the back of the device. It is to be appreciated that these sensors may detect user input through physical touch or touch hovering, or a combination of these.

The one or more particular user inputs may be provided on a touch and hover sensing display. For example, the display may be configured to detect the user's finger and palm when they are on the edges of the display and not touching, but still partially within the hover sensing area.

The area of the peep-hole may be related to the force/pressure of the user input (e.g. larger force creating a larger peep-hole). The area of the peep-hole may be pre-determined or user defined.

The foreground view may comprise a combination of one or more of: a screensaver; an application view; a locked mode view; a window; and a home screen view.

For example, the foreground view may comprise an email application and the second content may comprise a recently received message. The second content may comprise contextual information (e.g. providing information on a background activity such as download or update progress). The foreground view may comprise an application and the peep-hole may allow the user to see the music that is being played.

Second content may comprise one or more of: web-page (e.g. with regularly refreshed content); friend's status (e.g. on Facebook®); Twitter®feed; RSS feed; calendar; alarm clock; contacts list; media player; music playlist; games (e.g. online chess); notes; to-do list; weather; and a map.

The apparatus may be at least one of a portable electronic device, circuitry for a portable electronic device, a laptop computer, a desktop computer, a mobile phone, a Smartphone, a tablet PC, a personal digital assistant, a game controller, the portable communications device and a module for the same.

In a second aspect, there is provided a method, the method comprising:
 detecting one or more particular user inputs from respective one or more positions, each position associated with a respective edge region of a display or a portable electronic device; and
 in response to the detection of the one or more particular user inputs, modifying at least a portion of a foreground view on the display to create a peep-hole within the foreground view in the portion, the foreground view comprising first content data associated with a foreground application and the peep-hole comprising second content data.

In a third aspect, there is provided a computer program comprising computer program code configured to:
 detect one or more particular user inputs from respective one or more positions, each position associated with a respective edge region of a display; and
 in response to the detection of the one or more particular user inputs, modify at least a portion of a foreground view on the display to create a peep-hole within the foreground view in the portion, the foreground view comprising first content data associated with a foreground application and the peep-hole comprising second content data.

The computer program may be stored on a storage media (e.g. on a CD, a DVD, a memory stick or other non-transitory medium). The computer program may be configured to run on a device or apparatus as an application. An application may be run by a device or apparatus via an operating system.

In a fourth aspect, there is provided an apparatus, the apparatus comprising:

means for detecting configured to detect one or more particular user inputs from respective one or more positions, each position associated with a respective edge region of a display; and means for modifying configured to modify, in response to the detection of the one or more particular user inputs, at least a portion of a foreground view on the display to create a peep-hole within the foreground view in the portion, the foreground view comprising first content data associated with a foreground application and the peep-hole comprising second content data.

The present disclosure includes one or more corresponding aspects, embodiments or features in isolation or in various combinations whether or not specifically stated (including claimed) in that combination or in isolation. Corresponding means for performing one or more of the discussed functions are also within the present disclosure.

Corresponding computer programs for implementing one or more of the methods disclosed are also within the present disclosure and encompassed by one or more of the described embodiments.

BRIEF DESCRIPTION OF THE SEVERAL VIEWS OF THE DRAWING(S)

A description is now given, by way of example only, with reference to the accompanying drawings, in which.

DETAILED DESCRIPTION OF THE INVENTION

Other embodiments depicted in the figures have been provided with reference numerals that correspond to similar features of earlier described embodiments. For example, feature number 1 can also correspond to numbers 101, 201, 301 etc. These numbered features may appear in the figures but may not have been directly referred to within the description of these particular embodiments. These have still been provided in the figures to aid understanding of the further embodiments, particularly in relation to the features of similar earlier described embodiments.

It is common for an electronic device to have a user interface (which may or may not be graphically based) to allow a user to interact with the device. For example, the user may use a keyboard to enter text or icons to select and run applications. Generally, for devices which provide multiple applications, switching between the applications is enabled via a dedicated button or through swiping interaction.

It may be beneficial to allow the user to access other content data from a foreground view of a graphical user interface without having to navigate away from that view. Example embodiments contained herein may be considered to provide a way of allowing a user to create a peep-hole in the current foreground view of a display, the peep-hole configured to provide second content data.

Figure 1:
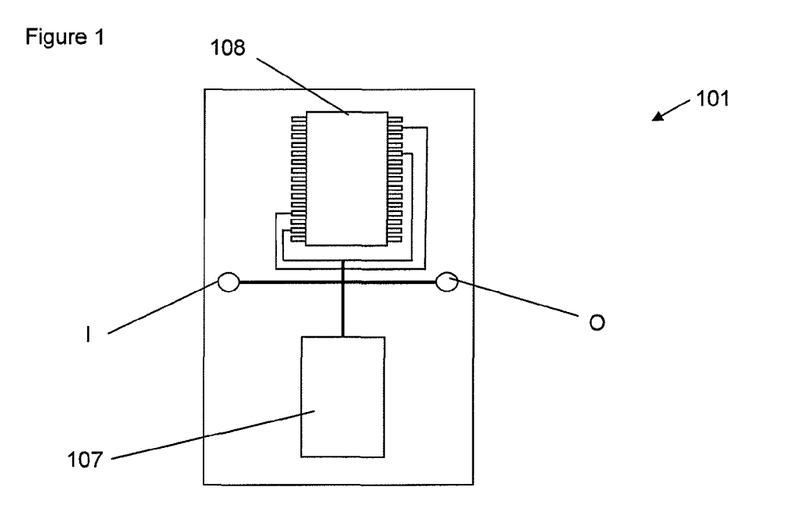
FIG. 1 depicts an embodiment comprising a number of electronic components, including memory and a processor.

FIG. 1 shows an apparatus (101) comprising memory (107), a processor (108), input I and output O. In this embodiment only one processor and one memory are shown but it will be appreciated that other embodiments may utilise more than one processor and/or more than one memory (e.g. same or different processor/memory types).

In this embodiment the apparatus (101) is an application specific integrated circuit (ASIC) for a portable electronic device with a touch sensitive display. In other embodiments the apparatus (101) can be a module for such a device, or may be the device itself, wherein the processor (108) is a general purpose CPU of the device and the memory (107) is general purpose memory comprised by the device.

The input I allows for receipt of signalling to the apparatus 101 from further components, such as components of a portable electronic device or the like. The output O allows for onward provision of signalling from within the apparatus 101 to further components. In this embodiment the input I and output O are part of a connection bus that allows for connection of the apparatus 101 to further components.

The processor 108 is a general purpose processor dedicated to executing/processing information received via the input I in accordance with instructions stored in the form of computer program code on the memory 107. The output signalling generated by such operations from the processor 108 is provided onwards to further components via the output O.

The memory 107 (not necessarily a single memory unit) is a computer readable medium (solid state memory in this example, but may be other types of memory such as a hard drive, ROM, RAM, Flash or the like) that stores computer program code. This computer program code stores instructions that are executable by the processor 108, when the program code is run on the processor 108. The internal connections between the memory 107 and the processor 108 can be understood to, in one or more embodiments, provide an active coupling between the processor 108 and the memory 107 to allow the processor 108 to access the computer program code stored on the memory 107.

In this embodiment the input I, output O, processor 108 and memory 107 are all electrically connected to one another internally to allow for electrical communication between the respective components I, O, 108, 107. In this example the components are all located proximate to one another so as to be formed together as an ASIC, in other words, so as to be integrated together as a single chip/circuit that can be installed into an electronic device. In other embodiments one or more or all of the components may be located separately from one another.

Figure 2:
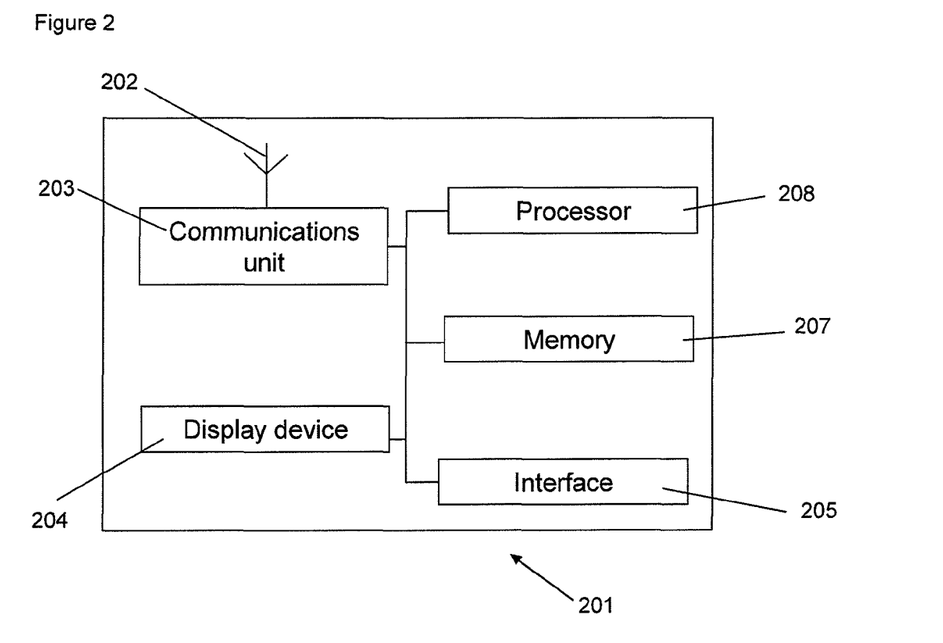
FIG. 2 depicts an embodiment comprising a number of electronic components, including memory, a processor and a communication unit.

FIG. 2 depicts an apparatus (201) of a further example embodiment, such as a mobile phone. In other example embodiments, the apparatus (201) may comprise a module for a mobile phone (or PDA or audio/video player), and may just comprise a suitably configured memory (207) and processor (208).

The example embodiment of FIG. 2, in this case, comprises a display device (204) such as, for example, a Liquid Crystal Display (LCD) or touch-screen user interface. The apparatus (201) of FIG. 2 is configured such that it may receive, include, and/or otherwise access data. For example, this example embodiment (201) comprises a communications unit (203), such as a receiver, transmitter, and/or transceiver, in communication with an antenna (202) for connecting to a wireless network and/or a port (not shown) for accepting a physical connection to a network (or other input device, e.g. micro USB port), such that data may be received via one or more types of networks. This example embodiment comprises a memory (207) that stores data, possibly after being received via antenna (202) or port or after being generated at the user interface (205). The processor (208) may receive data from the user input interface (205), from the memory (207), or from the communication unit (203). It will be appreciated that, in certain example embodiments, the display device (204) may incorporate the user input interface (205). Regardless of the origin of the data, these data may be outputted to a user of apparatus (201) via the display device (204), and/or any other output devices provided with apparatus. The processor (208) may also store the data for later use in the memory (207). The memory (207) may store computer program code and/or applications which may be used to instruct/enable the processor (208) to perform functions (e.g. read, write, delete, edit or process data).

Figure 3A:
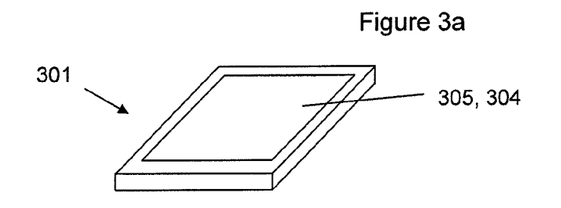
FIG. 3a-3e depicts an example embodiment of FIG. 2 wherein the peep-hole is created to view a home screen.

FIG. 3a depicts an example embodiment of the apparatus depicted in FIG. 2 comprising a portable electronic communications device (301), e.g. such as a mobile phone, with a user interface comprising a touch-screen user interface (305, 304), a memory (not shown), a processor (not shown) and an antenna (not shown) for transmitting and/or receiving data (e.g. emails, textual messages, phone calls, information corresponding to web pages).

Figure 3B:
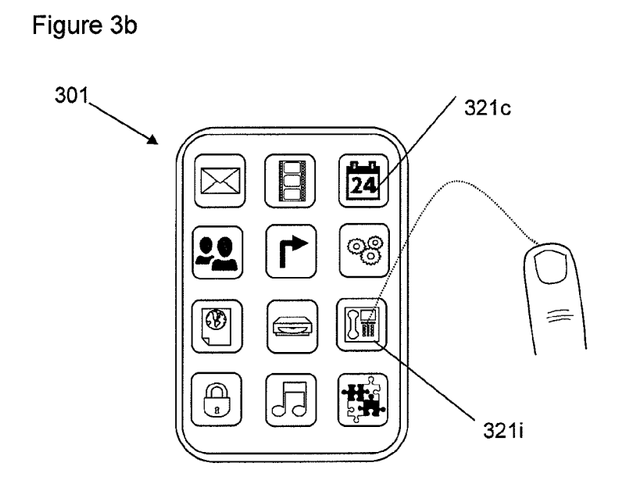

FIGS. 3b-e illustrates a series of views of the example embodiment of FIG. 3a when the mobile phone device (201) is in use. FIG. 3b depicts the home screen of the electronic device when the device is first turned on. The home screen depicts an array of icons wherein each icon represents a different application available to the user. In this case the applications comprises: an email client, a movie player, a calendar application (in this example, the icon of the calendar application is configured to display the current date), a messaging application, a navigation application, a settings control application, a web browser application, a external device interface application, a telephone application, a locking application, an music player application, and a games application.

Figure 3C:
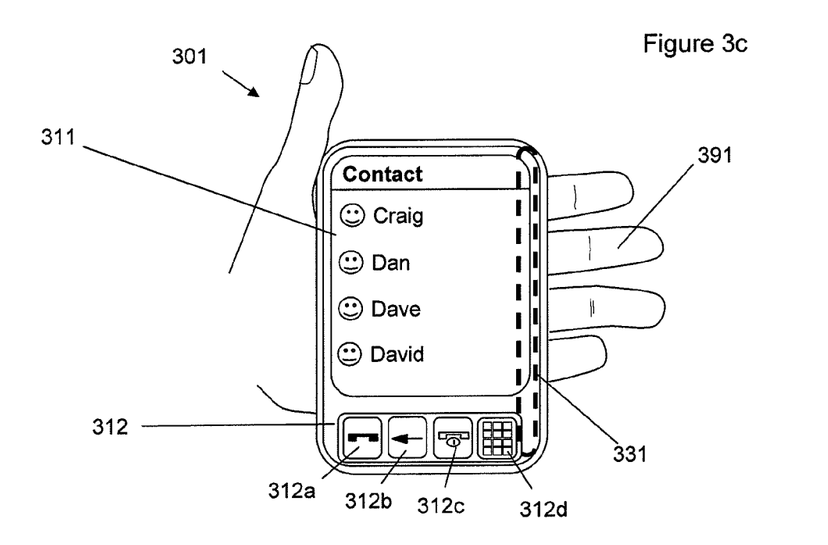

In this case, the user wishes to open the telephone application. To do this, the user selects the corresponding telephone application icon (321i). This opens the telephone application and presents the telephone application in a foreground view (as depicted in FIG. 3c). The foreground view of the telephone application comprises: a contact list (311), and a telephone application icon region (312). The telephone application icon region comprises a initiate call icon (312a) configured to enable the user to initiate a call to a selected icon; a back icon (312b), configured to return the electronic device to the previous screen; a terminate call icon (312c) configured to enable the user to terminate an ongoing call; and a numeric keypad icon (312d) which enables a numeric keypad to be presented to allow the user to enter telephone numbers manually.

In this case, the user wishes to know what the date is. He knows that the calendar application icon (321c on FIG. 3b) on the home screen comprises the date. That is, in this case, he wishes to receive information from the home screen rather than to interact with the home screen. In this case, this embodiment comprises a peep-hole detection area (331) on the right hand of the display. This example embodiment is configured to detect one or more particular user inputs from respective one or more positions, each position associated with a respective edge region of the display along the peep-hole detection area (331); and upon detection of the one or more particular user inputs, modify at least a portion of a foreground view on the display to create a peep-hole within the foreground view in the portion, the foreground view comprising first content data associated with a foreground application and the peep-hole comprising second content data.

Figure 3D:
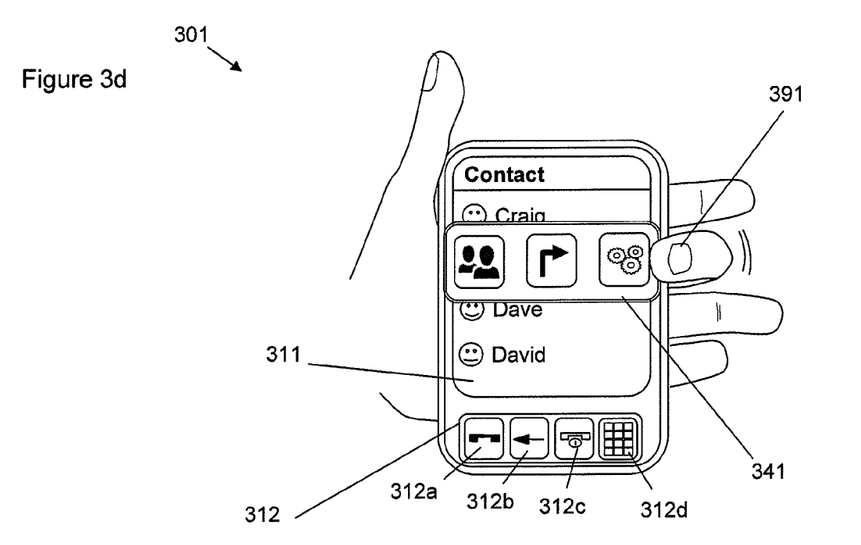

To create a peep-hole, the user provides an input to the peep-hole detection area (331) using his finger (391) as depicted in FIG. 3d (e.g. by contacting with, or hovering over the peep-hole detection area). For this embodiment, the peep-hole (341) comprises a horizontal strip extending across the screen. The vertical position of the peep-hole, for this embodiment, is configured to be aligned with the particular user input. The vertical width of the peep-hole, for this embodiment, is configured to have a pre-defined relationship with the pressure of the input (e.g. proportional to the pressure of the input). In the situation depicted in FIG. 3d, the user is providing a low pressure input to the peep-hole detection area. The second content data of the peep-hole in this case comprises home screen content data comprising a row of the home screen application icons. The displayed home screen icons are displayed in positions corresponding to their positions on the home screen. In this case, the peep-hole does not reveal the home screen calendar application icon. The portions of the foreground view not forming part of the peep-hole remain unchanged.

In this case the peep-hole provides a view of the second content data which is user perceived to be in a layer above the layer of the first content data. It will be appreciated that for other example embodiments the peep hole may be configured to be user perceived to be in one of a layer below the layer of the first content data or in a layer at the same layer as the layer of the first content data (e.g. by using shadow visual effects).

It will be appreciated that other example embodiments may comprise peep-hole detection areas on either side, or both sides of the display. Furthermore, other example embodiments may comprise peep-hole detection areas on the top and/or bottom side of the screen. It will be appreciated that other example embodiments may comprise peep-hole detection areas on the device.

It will be appreciated that the user interface and/or the device may provide an indication when a peep-hole action is possible. For example, when the user has gripped or is holding the device in an area where the peep-hole can be activated, prior or during that, a visual, auditory and/or tactile feedback may be provided to the user to indicate that a peep-hole can be actuated when the user provides a further input. For example, the user interface close to the peep-hole activating areas may visually change/flash for a brief time, or a tactile feedback signal may be provided to remind/instruct the user that by providing an input the peep-hole is activated. The instructing indication may be user-/device-configurable and thus may not always be indicated and could be indicated as an instructional reminder for a new user using the device.

Figure 3E:
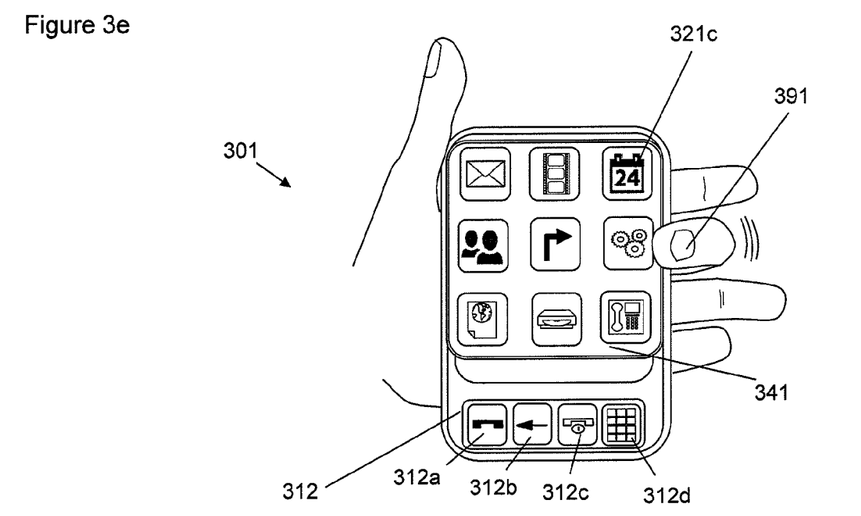

It will be appreciated that, as the vertical position of the peep-hole corresponds to the position of the particular user input, the user could, using this embodiment, move his finger such that the peep-hole would reveal the calendar application icon. However, in this example, the user elects to provide a higher pressure user input to the same position of the peep-hole detection area. As the vertical width of the peep-hole depends on the input pressure, this extends the vertical width of the peep-hole (341) such that the peep-hole second content data comprises the calendar application icon (FIG. 3e). In this way, the user can read the current date from the calendar application icon itself without having to navigate back to the home screen. In this case, when the user releases his finger from the peep-hole detection area, the electronic device is configured to return to the screen depicted in FIG. 3c. That is, in this case, the peep-hole is configured to be displayed whilst the user is providing input to the peep-hole detection area. This may allow the user to dynamically change the size and shape of the peep-hole on the display to see relevant information in the home screen or other application.

It will be appreciated that other example embodiment may be configured such that the peep-hole is configured to be initiated upon detecting the one or more particular user inputs (e.g. the peep-hole may be created in response to a tap input and persist after the tap input has finished).

It will be appreciated that the peep-hole position may initially correspond to the respective edge region of the display or portable electronic device associated with the particular one or more user inputs. The subsequent position of the peep-hole may be based on the orientation of the device. For example, the peep-hole may be provided as a visual effect animation like a rising bubble. The rising direction of the bubble can be detected with motion sensors, e.g. so that the bubble rises always upwards (opposite direction to gravity or away from the user in the particular use orientation). Alternatively/in addition, the peep-hole may be configured to move towards (and then stay for a predetermined period of time in) the part of the screen that has been updated since the user last time viewed it. In this case, the final size of the peep-hole may depend on the size of the updated information on the screen. For example, if the user was using a web browser application and the device indicated that the user had received a message, the user could create a peep-hole which could move to reveal the received message as second content data.

For this embodiment, the area of the peep-hole is related to the pressure of the user input. It will be appreciated that, for other example embodiments, the area of the peep-hole may not be related to the pressure of the input (e.g. the area of the peep-hole may be pre-defined and/or user-defined to be a particular size. However, the locus/position of the peep-hole would correspond to, be associated with, or be related to the position of the edge inputs e.g. a edge input towards the top would provide a peep-hole towards the top of the foreground view). It will be appreciated that, for other example embodiments, the area of the peep-hole may be related to the user input gesture (e.g. a double (edge) tap gesture input may result in a larger peep-hole area than a single tap gesture input).

It will be appreciated that for other example embodiments, the peep-hole may be a cone-shaped (or triangle-shaped) zone. In such embodiments, the amount of pressure applied to the single pressure point may define the width of the base of the "peep hole" cone on one or more sides of the display (e.g. on the same side or the opposite side of the display) or the position of the tip of the cone/triangle. In the case of a touch and hovering sensing display, the area of the hovering input can be used instead of amount of pressure.

It will be appreciated that the foreground view may provide different information according to the function/application being performed/used. For example, the foreground view may provide a virtual keyboard to enable the user to type a text, for example. In this case, the user may receive an indication that he has received a new SMS and use the peep-hole function to modify the current foreground view to provide a peep-hole therein to quickly and easily look and see the newly received message.

Similarly, the user may be, for example, synchronizing data with a service like cloud or e-mail in the background and wants to know the current status of update while using a particular different application in the foreground. He may create a peep-hole, in that foreground application, which would provide second content data relating to the status of the update.

In another example, the user could be browsing the web in a foreground view and may use the peep-hole to view second content data relating to his friend's Facebook page.

Figure 4A:
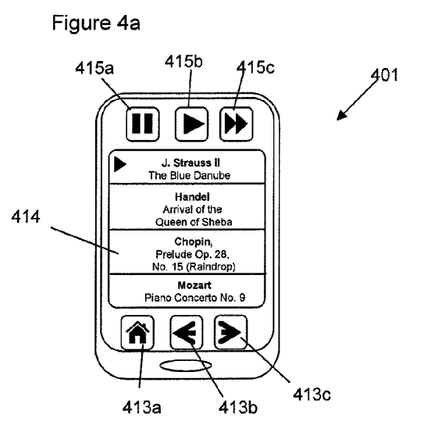
FIG. 4a-4g depicts a further example embodiment wherein a peep-hole is created to view an application when the device is in a locked screen saver mode.

FIG. 4a depicts a further example embodiment which is a digital music player. Like the previous embodiment, the music player comprises a touch screen user interface.

FIG. 4a depicts the music player as the user is listening to music. When the music player is playing music, the music application screen comprises: a playlist (414) of music files in the order that they are to be played; a number of music application icons (415a-c) enabling the user to navigate and control the music application; and device icons (413a-c) enabling the user to navigate to different screens of the device. The music application icons (415a-c) comprise a pause icon (415a) enabling the music to be paused, a play icon (415b) enabling a selected music file to be played, and a skip icon (415c), enabling the subsequent music file in the playlist to be selected. Music files can also be selected by interacting directly with the playlist (414) displayed in the music application screen.

Figure 4B:
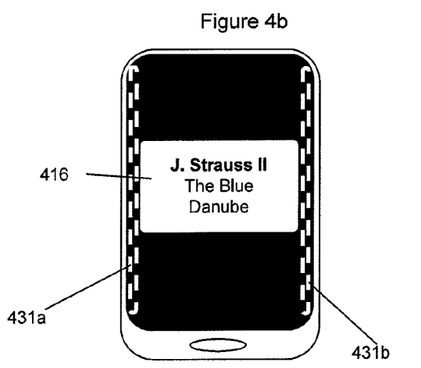

After a predetermined period of time during which the user is not interacting with the touch screen user interface, this embodiment is configured to enter a sleep, or locked/background mode. In the sleep mode, the display is configured to display the name of the currently playing music file (416) in a foreground view, which in this case, is 'The Blue Danube' (as shown in FIG. 4b). This locked mode display may be considered to be a foreground screen saver view (In other locked/screen saver modes, the screen may be switched off (or be blank) and not show details of the currently playing tunes). After a time, the user wishes to hear the next file in the playlist, and so wants to quickly skip to the next file.

To allow the user to interact with the music application, the apparatus/electronic device is configured to allow the user to create a peep-hole in the foreground screen saver view.

In this case, the example embodiment comprises two lateral edge peep-hole detection areas—one on either side edge of the display (431a, 431b). In this case, the apparatus/electronic device is configured to detect one or more particular user inputs from respective one or more positions of the peep-hole detection areas, each position associated with a respective edge region of the display.

Figure 4C:
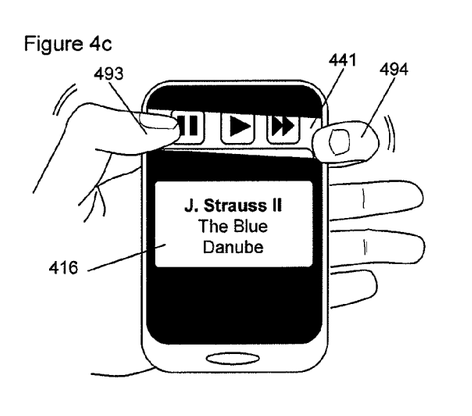

In this case, the user initially provides a particular user input using his thumb (493) at a position of the left peep-hole detection area associated with the top lateral edge region of the display and a particular user input using his forefinger (494) at a position of the right peep-hole detection area associated with the top lateral edge region of the display (this is shown in FIG. 4c). In response to the detection of the two particular user inputs, the apparatus/electronic device is configured to modify at least a corresponding portion of the screensaver foreground view on the display between the associated edge regions to create a peep-hole (441) within the foreground view in the portion. The peep-hole second content data comprises music application content data, which in this case comprises the music application icons (415a-c).

Figure 4D:
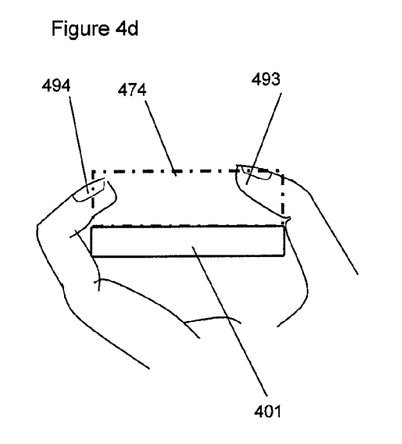

As shown in FIG. 4d, which is an overhead view of the situation depicted in FIG. 4c, this example embodiment is configured to detect a stylus (e.g. the user's finger (494) and/or thumb (493)) within a hovering detection region (474). This allows the user to provide input by hovering over the screen (e.g. the user does not need to touch the screen to provide input). That is, in this situation, the inputs provided by the user to create the peep-hole depicted in FIG. 4c are hovering inputs. It will be appreciated that other example embodiments may be configured to detect touch inputs instead of, or in addition to, hovering inputs.

Figure 4E:
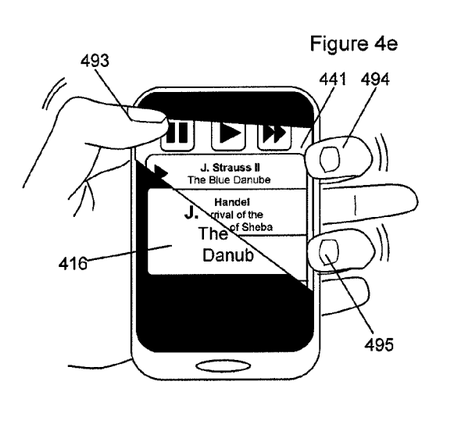

In this case, the user wishes to view the play list and so provides an additional particular user input using his ring finger (495) on the right peep-hole detection area (as depicted in FIG. 4*e*). In this case, in response to the detection of the three particular user inputs, the apparatus/electronic device is configured to modify the corresponding portion of the screen-saver foreground view on the display such that the peep-hole extends between the associated lateral edge regions associated with the multiple (three) input positions. The peep-hole now also comprises second content data relating to the play list (414). In another embodiment, the user may keep the position of the peep-hole but move the second content data window within the peep-hole e.g. by swiping the touch display, pressing cursors buttons, or moving his finger above the display in any direction.

In this case the peep-hole provides a view of the second content data which is user perceived to be in the same layer as the foreground layer of the first content data. It will be appreciated that for other example embodiments the peep hole may be configured to be user perceived to be in a layer below the layer of the first content data (e.g. by using shadow visual effects).

Figure 4F:
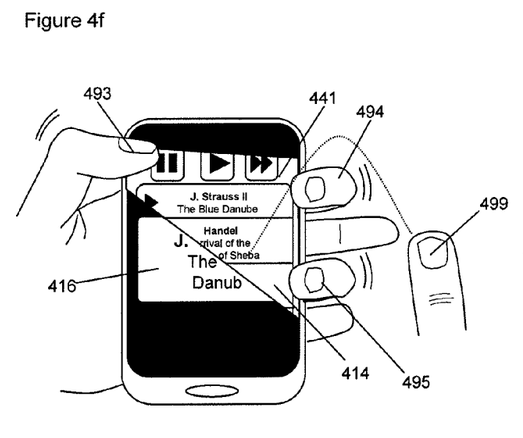

Unlike the previous embodiment, which was configured to provide information only, this example embodiment is configured to allow the user to interact with the second content data of the peep-hole (441) (in this case the music application second data). In this case, the user wishes to skip to the next music file in the play list. To do this, the user selects the desired music file by selecting the corresponding item from the music application second data using his finger (499) (as shown in FIG. 4*f*) by physically touching the display or by hovering his finger above the display.

Figure 4G:
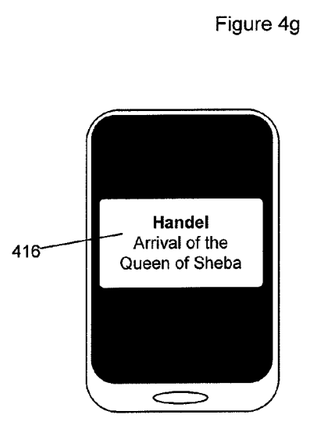

When the user has completed interacting with the music application, the user ceases providing input to the peep-hole detection areas and the peep-hole is closed. The electronic device is then configured to be in the screen saver mode, as depicted in FIG. 4*g* (which is updated with the currently playing music file, which is now 'Arrival of the Queen of Sheba').

It will be appreciated that, for other example embodiments, a music player application may not be configured to provide information in a foreground view when providing audio output (e.g. music). For example, a user may be listening to music with the music application in the background when typing a message. In such cases, the peep-hole may allow the user to access information relating to the background music application, such as seeing the length of the current song, or, as above, allowing for change of song selection.

It will be appreciated that other example embodiments may comprise top and/or bottom edge peep-hole detection areas instead of, or in addition to, the side edge peep-hole detection areas. Having top and/or bottom edge peep-hole detection areas may allow the user to create a vertical peep-hole (or of any shape). Also, if a user provided input corresponding to a portion of a top edge peep-hole detection area and a side edge peep-hole detection area the peep-hole may be created at an angle (e.g. 45°) with respect to the screen. This may allow the user greater flexibility in where the peep-hole portion is positioned and how it is orientated.

It will be appreciated that, for other example embodiments, the one or more inputs may be received from a combination of one or more of edge and non-edge positions of a phone/portable electronic device. For example, another example embodiment may be configured to detect the one or more particular user inputs (e.g. provided by a finger and/or palm) from an edge (e.g. top edge or side edge) and/or from the back of the device.

Figure 5A:
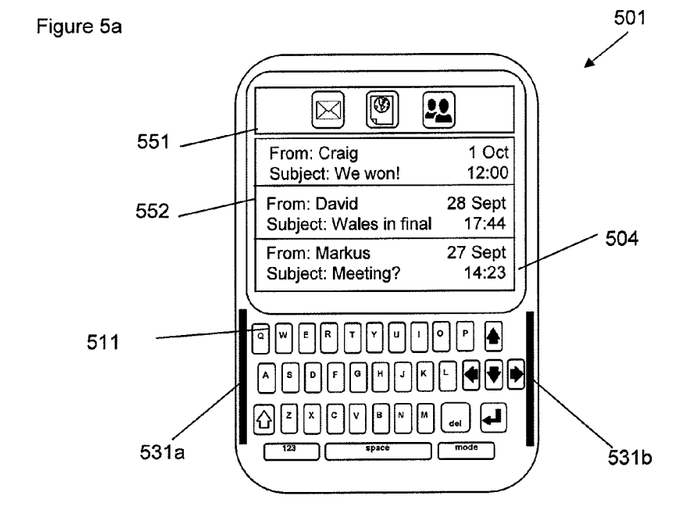
FIG. 5a-5d depicts a further example embodiment wherein a peep-hole is created to view other applications.

FIG. 5*a* depicts a further example embodiment which is a portable device that, unlike the previous embodiment, comprises physical keyboard (511) in addition to a touch screen user interface (504).

FIG. 5*a* depicts the portable device as the user is interacting with the device. When the user is interacting with the device, the display is configured to display: an icon region (551) comprising icons corresponding to the running applications; and a foreground application region (552), comprising information relating to a foreground application. The running applications in this case comprise: an email application, a web-browsing application; and a messaging application. In the situation depicted in FIG. 5*a*, the user is checking his email and the foreground view application is the email application.

In this example, the user wishes to quickly view whether any new information is available in the other running applications. To view the other applications, the user could manually navigate through the applications by selecting each in turn to be the foreground application (e.g. by selecting the corresponding running application icons). However, in this case, the user wishes to create a peep-hole to view the content available.

Unlike the previous embodiments, where the input was provided directly with the touch screen user interface, this example embodiment comprises two dedicated peep-hole detection areas (531*a*, 531*b*) on either side of the physical keyboard (511). Each position on the dedicated peep-hole detection is associated with a respective edge region of the display. That is, in this case, the top of each peep-hole detection area is associated with the top of the display on the same side as the respective peep-hole detection area, and the bottom of each peep-hole detection area is associated with the bottom of the display on the same side as the respective peep-hole detection area. The relative positions between the top and bottom of the peep-hole detection area are associated with the corresponding relative positions on the same side of the display. In this case the peep-hole detection areas are also configured to detect the pressure of the one or more particular user inputs. The pressure of the input determines the second content data displayed in the peep-hole portion.

Figure 5B:
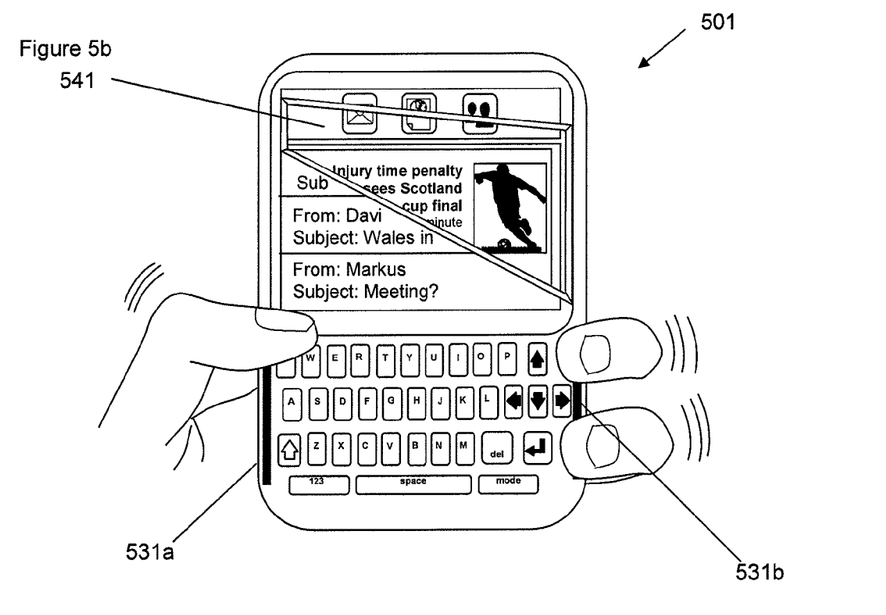

In the example depicted in FIG. 5*b*, the user has provided three low pressure user inputs to the peep-hole detection areas (531*a*, 531*b*). In response to the detection of the three user inputs, the apparatus/electronic device is configured to modify the corresponding portion of a foreground view on the display to create a peep-hole (541) within the foreground view. In this case, as the inputs are low pressure, the second content data of the peep-hole comprises second content data from the next running application which, in this case, is the web-browser application (as illustrated in FIG. 5*b*). In this case, the apparatus/electronic device is configured to leave the remaining portions of the foreground view not associated with the peep-hole (541) unchanged. It will be appreciated that the second content data may be based on an event. For example, if a new message had been received, the apparatus/device may be configured to display the newly received message as second content data.

In this case, the peep-hole (541) is configured to persist whilst the user input is ongoing. This may allow the user to dynamically change the size, shape and position of the peep-hole on the display. The peep-hole (541) is configured to disappear in response to detecting that the user input has ceased. It will be appreciated that, in other example embodiments, the apparatus/device may be configured to show a peep-hole into a specific application when first applying a specific one or more particular user inputs (subsequently, the shape and position of the peep-hole may be adjusted dynamically).

In this case the peep-hole provides a view of the second content data which is configured to be user perceived to be in a first layer below the layer of the first content data (in this case by using a frame visual effect).

Figure 5C:
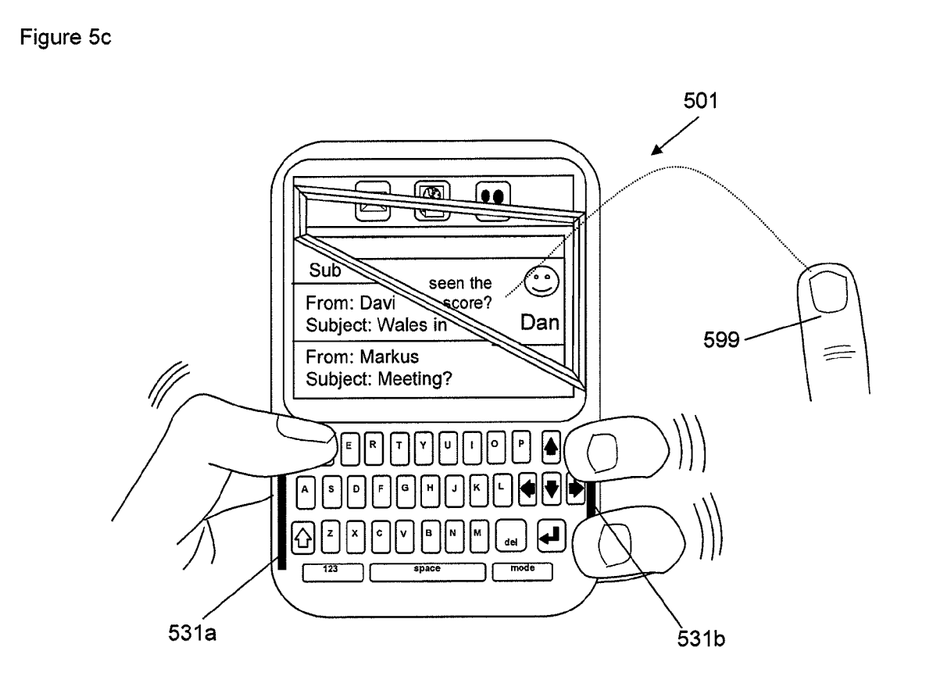

When the user has finished reviewing the information relating to the web-browser application, the user wishes to review data relating to the messaging application. To do this the user increases the pressure of the inputs which changes the content of the peep-hole to correspond to the running application after the next (i.e. the messaging application). This is shown in FIG. 5c. In this case the peep-hole provides a view of the second content data which is configured to be user perceived to be in a second layer below the layer of the first content data (in this case by using an additional frame visual effect).

From the peep-hole, the user can see that he has received a new message. Unlike the embodiment of FIG. 3, which did not allow the user to interact with the second content data, and unlike the embodiment of FIG. 4 which allowed full interaction with the second content data, this embodiment is configured to enable the user to make the application providing the second content data the foreground view application by selecting the second content data with a stylus (e.g. his finger (599) in this case).

Figure 5D:
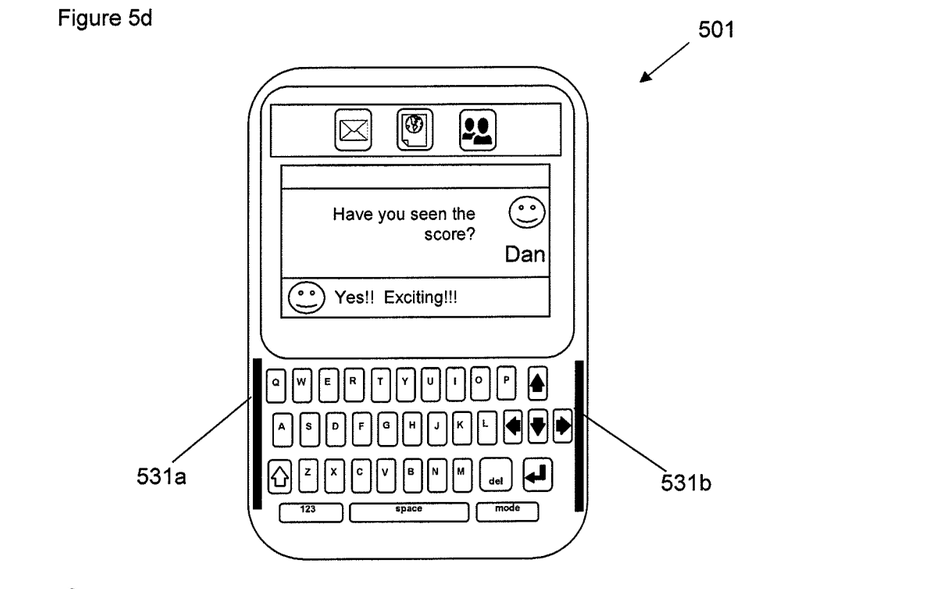

In this case, the user wishes to respond to the new message and so the user selects the second content data by providing a user input within the peep-hole portion. In response to this input, the messaging application is selected as the foreground view application. The user can then enter a response into the messaging application using the physical keypad (511) (as depicted in FIG. 5d).

It will be appreciated that allowing the user to peak second content data may make the device use more efficient as the user doesn't have to fully switch between applications just to get a glance of what is going on in a background application. Likewise, when the electronic device is used in the screen saver embodiment, allowing the user to peak second content data may make screen saver use more efficient, allowing the user to save some battery power in the daily use of the device.

It will be appreciated that there may be other example uses of the peep-hole. For example, the user may be setting up an alarm in a foreground view and use a peep-hole to take a peek into the calendar (the calendar providing second content data) to remind him of tomorrow's agenda.

Another example use might be that the apparatus is configured to allow the user to type a message in a foreground view. When the user presses opposite sides of the device a peep-hole is created which provides second content data relating a social network application (e.g. Facebook). This may allow the user to continue typing the message using the foreground view but still also to view the social network second content data provided by the peep-hole.

It will be appreciated that different particular user input may result in different second content data to be displayed. For example, a first set of one or more particular user inputs may provide second content data relating to a calendar application, whereas a second set of one or more particular user inputs may provide second content data relating to a weather application.

It will be appreciated that other example embodiments may be configured such that the position of the peep-hole is independent of the positions of the one or more particular user inputs. For example, the position of the peep-hole may be pre-defined (e.g. user defined in advance) and/or dependent on an event. For example, if a new message was received the position of the peep-hole may be configured to reveal the message regardless of the positions of the one or more particular user inputs.

Figure 6:
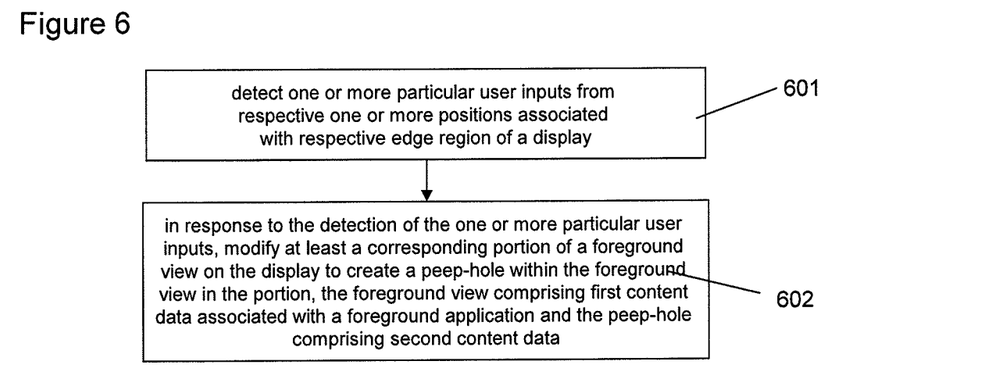
FIG. 6 depicts a flow diagram describing the creation of a peep-hole which provides second content data.

FIG. 6 shows a flow diagram illustrating the provision of a peep-hole, and is self-explanatory.

Figure 7:
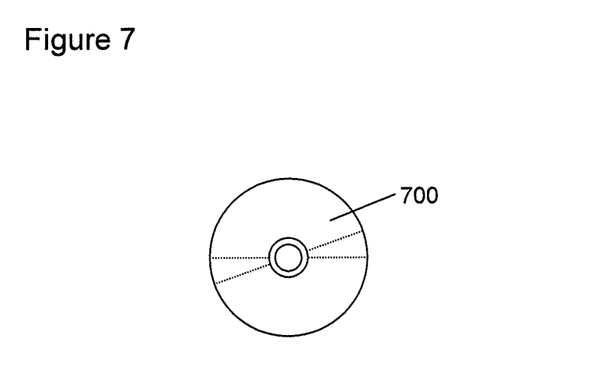
FIG. 7 illustrates schematically a computer readable media providing a program according to an example embodiment.

FIG. 7 illustrates schematically an embodiment comprising a computer/processor readable media 700 providing a computer program. In this example, the computer/processor readable media is a disc such as a digital versatile disc (DVD) or a compact disc (CD). In other embodiments, the computer readable media may be any media that has been programmed in such a way as to carry out an inventive function.

It will be appreciated to the skilled reader that any mentioned apparatus/device and/or other features of particular mentioned apparatus/device may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that the any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features of the invention as applied to preferred embodiments thereof, it will be understood that various omissions and substitutions and changes in the form and details of the devices and methods described may be made by those skilled in the art without departing from the scope of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

That which is claimed:

1. An apparatus comprising:
   at least one processor; and
   at least one memory including computer program code,
   the at least one memory and the computer program code configured to, with the at least one processor, cause the apparatus to perform at least the following:
   in response to detection of multiple concurrent single-handed particular user inputs from two or more positions, at least two of the two or more positions associated with opposite edge regions of a display of a hand-held portable electronic device, modify a portion of a foreground view on the display to create a peep-hole entirely within the foreground view in the portion, the peep-hole position associated with the detected positions of the multiple concurrent single-handed particular user inputs, and leave the remaining portions of the foreground view not associated with the peep-hole otherwise unchanged, the foreground view comprising first content data associated with a foreground application, wherein the creation of the peep-hole reveals second content data, the revealed second content data being a corresponding partial portion of a background view associated with a background application, the background application being one of a different application running in the background or a home screen.

2. The apparatus of claim 1, wherein the peep-hole provides a view of the second content data which is user perceived to be in one of a layer below the layer of the first content data or in a layer at the same layer as the layer of the first content data.

3. The apparatus of claim 1, wherein the second content data is associated with at least one of a further application or content data other than the first content data associated with the foreground application.

4. The apparatus of claim 1, wherein upon the cessation of the detection of the particular user inputs, the apparatus is configured to remove the peep-hole to again provide the foreground view.

5. The apparatus of claim 1, wherein the foreground view is associated with a first window and the background view is associated with a second window.

6. The apparatus of claim 1, wherein the one or more particular user inputs are received via one or more of:
   a stretch sensor;
   a capacitive sensor;
   a button stripe; and
   a resistive stripe.

7. The apparatus of claim 1, wherein the area of the peep-hole is related to one or more of:
   the force of one or more of the particular user inputs;
   the input gesture of one or more of the particular user inputs.

8. The apparatus of claim 1, wherein a subsequent position of the peep-hole is based on one or more of:
   the orientation of the device; and
   information relating to an event.

9. The apparatus of claim 1, wherein the foreground view comprises one or more of: a screensaver; an application view; a locked mode view; a window; or a home screen view.

10. The apparatus according to claim 1, wherein the apparatus is at least one of a portable electronic device, circuitry for a portable electronic device, a mobile phone, a Smartphone, a tablet PC, a personal digital assistant, the portable communications device or a module for the same.

11. The apparatus of claim 1, wherein the apparatus is configured to detect multiple concurrent particular user inputs, and wherein the peep-hole is configured to extend between lateral edge regions associated with the multiple concurrent particular user inputs.

12. The apparatus of claim 1, wherein the partial portion relates to relevant information based on the user's context.

13. The apparatus of claim 1, wherein the apparatus is configured to detect the multiple concurrent single-handed particular user inputs from the hand holding the portable electronic device.

14. The apparatus of claim 1, wherein the two or more positions of the multiple concurrent single-handed inputs correspond to edge positions of the display of the hand-held portable electronic device and are offset from the display.

15. A method, the method comprising:
   in response to detecting multiple concurrent single-handed particular user inputs from two or more positions, at least two of the two or more positions associated with opposite edge regions of a display of a hand-held portable electronic device, modifying a portion of a foreground view on the display to create a peep-hole entirely within the foreground view in the portion, the peep-hole position associated with the detected positions of the multiple concurrent single-handed particular user inputs, and leaving the remaining portions of the foreground view not associated with the peep-hole otherwise unchanged, the foreground view comprising first content data associated with a foreground application, wherein the creation of the peep-hole reveals second content data, the revealed second content data being a corresponding partial portion of a background view associated with a background application, the background application being one of a different application running in the background or a home screen.

16. A computer-readable non-transitory medium comprising computer program code configured to:
  in response to detection of multiple concurrent single-handed particular user inputs from two or more positions, at least two of the two or more positions associated with opposite edge regions of a display of a hand-held portable electronic device, modify a portion of a foreground view on the display to create a peep-hole entirely within the foreground view in the portion, the peep-hole position associated with the detected positions of the multiple concurrent single-handed particular user inputs, and leave the remaining portions of the foreground view not associated with the peep-hole otherwise unchanged, the foreground view comprising first content data associated with a foreground application, wherein the creation of the peep-hole reveals second content data, the revealed second content data being a corresponding partial portion of a background view associated with a background application, the background application being one of a different application running in the background or a home screen.

* * * * *